US006995195B2

(12) United States Patent
Ishii et al.

(10) Patent No.: US 6,995,195 B2
(45) Date of Patent: Feb. 7, 2006

(54) VINYL COMPOUND AND CURED PRODUCT THEREOF

(75) Inventors: Kenji Ishii, Tokyo (JP); Yasumasa Norisue, Tokyo (JP); Daisuke Ohno, Tokyo (JP); Makoto Miyamoto, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 182 days.

(21) Appl. No.: 10/626,569

(22) Filed: Jul. 25, 2003

(65) Prior Publication Data

US 2004/0198863 A1 Oct. 7, 2004

(30) Foreign Application Priority Data

Jul. 25, 2002 (JP) .............................. 2002-216724
Aug. 1, 2002 (JP) .............................. 2002-224937

(51) Int. Cl.
*C08F 16/12* (2006.01)
*C07C 43/215* (2006.01)
(52) U.S. Cl. ..................... 522/181; 526/333; 526/332; 568/630; 568/632; 568/635
(58) Field of Classification Search ............... 522/162, 522/134–147, 181; 528/205, 211, 219; 525/534; 568/630, 634, 635, 636, 639; 526/333, 332
See application file for complete search history.

(56) References Cited

U.S. PATENT DOCUMENTS

| 6,352,782 B2 * | 3/2002 | Yeager et al. ................ 428/461 |
| 6,689,920 B2 * | 2/2004 | Ishii et al. ................... 568/638 |
| 6,794,481 B2 * | 9/2004 | Amagai et al. ............. 528/219 |
| 6,835,785 B2 * | 12/2004 | Ishii et al. ................... 525/391 |
| 2004/0132941 A1 * | 7/2004 | Ishii et al. ................... 526/319 |
| 2005/0042466 A1 * | 2/2005 | Ohno et al. ................. 428/457 |

FOREIGN PATENT DOCUMENTS

| DE | 31 17 514 | | 12/1982 |
| EP | 0 542 232 | | 5/1993 |
| EP | 0 546 497 | | 6/1993 |
| JP | 6-87970 | * | 3/1994 |
| NL | 8 902 092 | | 3/1991 |
| WO | 00 46275 | | 8/2000 |
| WO | WO 03/020781 A1 | * | 3/2003 |

OTHER PUBLICATIONS

Abstract for JP406087970A, "Stabilized Polyphenylene Ether Resin Foam", Mar. 29, 1994.*

* cited by examiner

*Primary Examiner*—Susan Berman
(74) *Attorney, Agent, or Firm*—Wenderoth, Lind & Ponack, L.L.P.

(57) ABSTRACT

There are provided a vinyl compound which is excellent in heat resistance and electric characteristics and excellent in reactivity by introducing a vinyl group into a terminal of a bifunctional polyphenylene ether oligomer, and a cured product thereof which has a high glass transition temperature, has a low dielectric constant and a low dielectric loss tangent and has the excellent properties of polyphenylene ether.

8 Claims, No Drawings

VINYL COMPOUND AND CURED PRODUCT THEREOF

FIELD OF THE INVENTION

The present invention relates to a novel vinyl compound, a curable resin composition containing the above compound and cured products of these. More specifically, according to the vinyl compound of the present invention, there can be provided a polymer material which can give a cured product excellent in heat resistance and dielectric characteristics by polymerizing the vinyl compound itself or copolymerizing the vinyl compound and a different unsaturated compound.

Further, it can be used, as a material which is thermally and electrically excellent and can be cured by heat or light, for wide uses such as a resin for a resist, a sealing resin for a liquid-crystal display panel, a resin for a color filter of a liquid crystal, a UV coating composition, various coating agents, an adhesive, a buildup laminate material, and the like.

BACKGROUND OF THE INVENTION

Conventionally, vinyl compounds are widely used as a raw material for various functional polymer materials such as a photosensitive material, an optical material, a dental material, an electronic material and crosslinking agents for various polymers. However, since higher performances are required in these application fields in recent years, physical properties required as a functional polymer material become severer increasingly. As such physical properties, for example, heat resistance, weather resistance, chemical resistance, low moisture absorptivity, high refractive index, high fracture toughness, low dielectric constant and low dielectric loss tangent are required. Until now, these required physical properties have not been completely satisfied.

SUMMARY OF THE INVENTION

It is an object of the present invention to provide a novel vinyl compound and a curable resin composition each of which is curable by heat or light, and gives a cured product having excellent heat resistance and having a low dielectric constant and a low dielectric loss tangent.

The present invention relates to a vinyl compound of the formula (1),

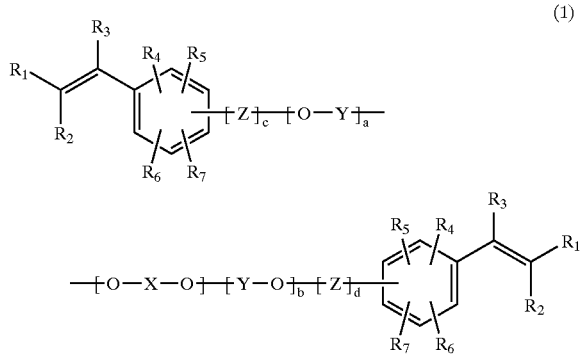

(1)

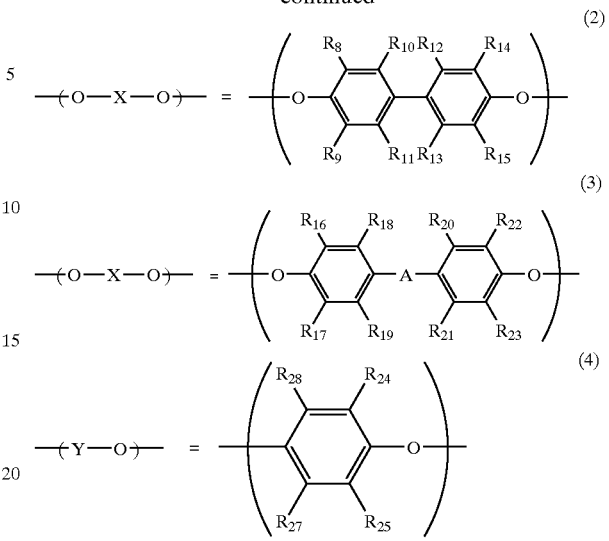

wherein $R_1$, $R_2$, $R_3$, $R_4$, $R_5$, $R_6$ and $R_7$ may be the same or different and are a hydrogen atom, a halogen atom, an alkyl group, a halogenated alkyl group or a phenyl group, —(O—X—O)— is represented by the formula (2) or the formula (3) (in which $R_8$, $R_9$, $R_{10}$, $R_{14}$, $R_{15}$, $R_{16}$, $R_{17}$, $R_{22}$ and $R_{23}$ maybe the same or different and are a halogen atom, an alkyl group having 1 to 6 carbon atoms or a phenyl group, $R_{11}$, $R_{12}$, $R_{13}$, $R_{18}$, $R_{19}$, $R_{20}$ and $R_{21}$ may be the same or different and are a hydrogen atom, a halogen atom, an alkyl group having 1 to 6 carbon atoms or a phenyl group, and and A is a linear or cyclic hydrocarbon which has 1 to 20 carbon atoms and which may have a substituent), —(Y—O)— is an arrangement of one kind of structure defined by the formula (4) or a random arrangement of at least two kinds of structures defined by the formula (4) (in which $R_{24}$ and $R_{25}$ may be the same or different and are a halogen atom, an alkyl group having 1 to 6 carbon atoms or a phenyl group, and $R_{26}$ and $R_{27}$ may be the same or different and are a hydrogen atom, a halogen atom, an alkyl group having 1 to 6 carbon atoms or a phenyl group), Z is an organic group which has at least one carbon atom and which may contain an oxygen atom, a nitrogen atom, a sulfur atom or a halogen atom, each of a and b is an integer of 0 to 300, provided that at least either a or b is not 0, and each of c and d is an integer of 0 or 1.

Further, the present invention provides a curable resin composition containing the vinyl compound of the formula (1) and a cured product obtained by curing the above composition.

DETAILED DESCRIPTION OF THE INVENTION

The present inventors have synthesized a compound obtained by introducing a thermosetting functional group to a terminal of a bifunctional polyphenylene ether oligomer having the excellent dielectric characteristics and heat resistance of polyphenylene ether (to be sometimes referred to as "PPE" hereinafter) (Japanese patent application No. 2002-018508) and a compound having thermosetting and photocurable functional groups introduced (Japanese patent application No.2002-038156 and 2002-055765). However, although the compound having a thermosetting functional group introduced has excellent low dielectric characteristics, it is not photocurable. On the other hand, the compound having thermosetting and photocurable functional groups introduced is photocurable, while it does not attain the low dielectric characteristics of a thermosetting compound. Thus, the present inventors have made diligent studies for obtaining a compound having thermosetting and photocurable functional groups and having low dielectric characteristics equal to those of a thermosetting compound. As a result, the present inventors have found that a cured product having high curability, a low dielectric constant, a low dielectric loss tangent and high heat resistance can be obtained by introducing a vinyl group into a bifunctional PPE oligomer compound of the formula (1) in which —(O—X—O)— is represented by the formula (2) or the formula (3) and —(Y—O)— is an arrangement of one kind of structure defined by the formula (4) or a random arrangement of at least two kinds of structures defined by the formula (4). Accordingly, the present inventors have completed the present invention.

In the compound of the formula (1), $R_1$, $R_2$, $R_3$, $R_4$, $R_5$, $R_6$ and $R_7$ may be the same or different and are a hydrogen atom, a halogen atom, an alkyl group, a halogenated alkyl group or a phenyl group. —(O—X—O)— is represented by the formula (2) or the formula (3) in which $R_8$, $R_9$, $R_{10}$, $R_{14}$, $R_{15}$, $R_{16}$, $R_{17}$, $R_{22}$ and $R_{23}$ may be the same or different and are a halogen atom, an alkyl group having 1 to 6 carbon atoms or a phenyl group. $R_{11}$, $R_{12}$, $R_{13}$, $R_{18}$, $R_{19}$, $R_{20}$ and $R_{21}$ may be the same or different and are a hydrogen atom, a halogen atom, an alkyl group having 1 to 6 carbon atoms or a phenyl group. A is a linear or cyclic hydrocarbon which has 1 to 20 carbon atoms and which may have a substituent. The above substituent is preferably an alkyl group having 1 to 6 carbon atoms. When —(O—X—O)— is represented by the formula (3), each of $R_1$ and $R_2$ is preferably an alkyl group, a halogenated alkyl group or a phenyl group. —(Y—O)— is represented by the formula (4) and is an arrangement of one kind of structure defined by the formula (4) or a random arrangement of at least two kinds of structures defined by the formula (4). $R_{24}$ and $R_{25}$ may be the same or different and are a halogen atom, an alkyl group having 1 to 6 carbon atoms or a phenyl group. $R_{26}$ and $R_{27}$ may be the same or different and are a hydrogen atom, a halogen atom, an alkyl group having 1 to 6 carbon atoms or a phenyl group. Z is an organic group having at least one carbon atom which may contain an oxygen atom, a nitrogen atom, a sulfur atom or a halogen atom. Each of a and b is an integer of 0 to 300, provided that at least either a or b is not 0. Each of c and d is an integer of 0 or 1.

Of these, preferred is —(O—X—O)— in which $R_8$, $R_9$, $R_{10}$, $R_{14}$, $R_{15}$, $R_{16}$, $R_{17}$, $R_{22}$ and $R_{23}$ are an alkyl group having 1 to 3 carbon atoms and $R_{11}$, $R_{12}$, $R_{13}$, $R_{18}$, $R_{19}$, $R_{20}$ and $R_{21}$ are a hydrogen atom or an alkyl group having 1 to 3 carbon atoms. More preferred is —(O—X—O)— in which $R_8$, $R_9$, $R_{10}$, $R_{14}$, $R_{15}$, $R_{16}$, $R_{17}$, $R_{22}$ and $R_{23}$ are a methyl group and $R_{11}$, $R_{12}$, $R_{13}$, $R_{18}$, $R_{19}$, $R_{20}$ and $R_{21}$ are a hydrogen atom or a methyl group.

Preferred is —(—Y—O—)— in which $R_{24}$ and $R_{25}$ are an alkyl group having 1 to 3 carbon atoms and $R_{26}$ and $R_{27}$ are a hydrogen atom or an alkyl group having 1 to 3 carbon atoms.

Particularly preferably, —(O—X—O)— is represented by the formula (7), and —(Y—O)— is represented by the formula (5) or the formula (6).

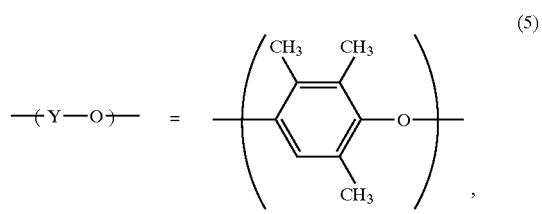

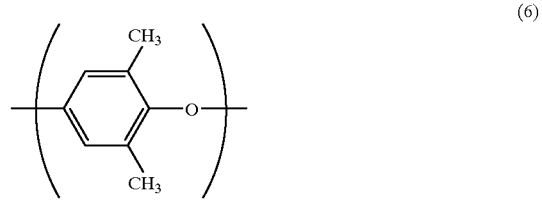

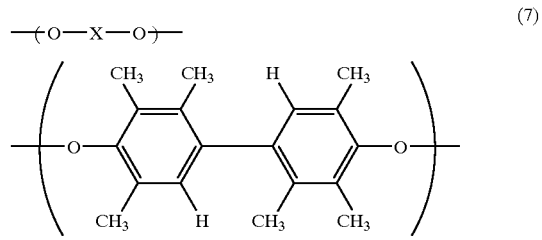

Z is preferably an organic group which has 1 to 10 carbon atoms and which may contain an oxygen atom or a sulfur atom. More specifically, examples thereof include the following groups.

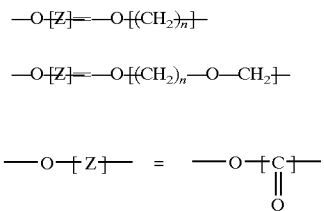

The production process of the vinyl compound of the formula (1) is not specially limited and the vinyl compound of the formula (1) may be produced by any methods. For example, it can be obtained by reacting a compound represented by the formula (8) with chloromethylstyrene in the presence of an alkaline catalyst such as sodium hydroxide, potassium carbonate or sodium ethoxide and optionally in the presence of a phase transfer catalyst such as benzyltri-n-butylammonium bromide or 18-crown-6-ether.

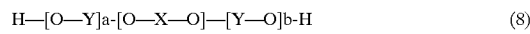

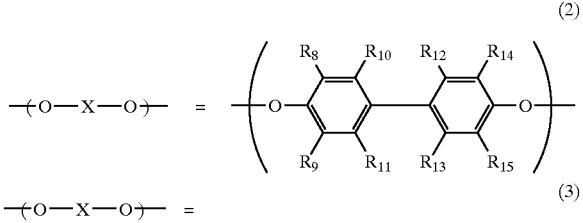

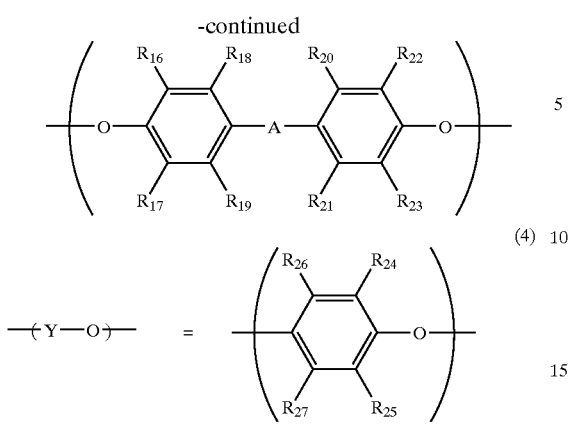

(4)

In the above formulae, $R_8$ to $R_{23}$ and A in the formula (2) and formula (3) are as defined in the before-mentioned formula (2) and formula (3), —(Y—O)— is an arrangement of one kind of structure defined by the formula (4) or a random arrangement of at least two kinds of structures defined by the formula (4), $R_{24}$ to $R_{27}$ are as defined in the before-mentioned formula (4), and each of a and b is an integer of 0 to 300, provided that at least either a or b is not 0.

The compound of the formula (8) is produced by, for example, the method disclosed in JP-A-2003-12796 or Japanese patent application No. 2002-018508 in which a bivalent phenol and a monovalent phenol are copolymerized.

Then, the curable resin composition of the present invention will be explained. The above curable resin composition contains the before-explained vinyl compound of the present invention. It is possible to incorporate a known epoxy resin, an oxetane resin, a compound having a polymerizable unsaturated group, photopolymerization and/or thermal-polymerization initiators, a photosensitizer, or the like, into the above resin composition.

The epoxy resin can be selected from generally known epoxy resins. Examples thereof include a bisphenol A type epoxy resin, a bisphenol F type epoxy resin, a biphenyl type epoxy resin, a phenol novolak type epoxy resin, a cresol novolak type epoxy resin, a xylene novolak type epoxy resin, triglycidyl isocyanurate, an alicyclic epoxy resin, a dicyclopentadiene novolak type epoxy resin, a biphenyl novolak type epoxy resin and epoxy resins having a PPE structure disclosed in Japanese patent application Nos. 2001-353194 and 2002-018508. These epoxy resins may be used alone or in combination.

The oxetane resin can be selected from generally known oxetane resins. Examples of the oxetane resin include alkyl oxetanes such as oxetane, 2-methyloxetane, 2,2-dimethyloxetane, 3-methyloxetane and 3,3-dimethyloxetane, 3-methyl-3-methoxymethyloxetane, 3,3'-di(trifluoromethyl) perfluorooxetane, 2-chloromethyloxetane, 3,3-bis(chlolomethyl) oxetane, OXT-101 (trade name, supplied by TOAGOSEI Co., Ltd.) and OXT-121 (trade name, supplied by TOAGOSEI Co., Ltd.). These oxetane resins may be used alone or in combination.

When the epoxy resin and/or the oxetane resin are used in the curable resin composition of the present invention, an epoxy resin curing agent and/or an oxetane resin curing agent can be used. The epoxy resin curing agent is selected from generally known curing agents. Examples of the epoxy resin curing agent include imidazole derivatives such as 2-methylimidazole, 2-ethyl-4-methylimidazole, 2-phenylimidazole, 1-cyanoethyl-2-phenylimidazole, 1-cyanoethyl-2-ethyl-4-methylimidazole, 2-phenyl-4,5-dihydroxymethylimidazole and 2-phenyl-4-methyl-5-hydroxymethylimidazole; amine compounds such as dicyandiamide, benzyldimethylamine and 4-methyl-N,N-dimethylbenzylamine; and phosphorus compounds such as phosphine compounds and phosphonium compounds. The oxetane resin curing agent can be selected from known cationic polymerization initiators. Commercially available examples include SAN-AID SI-60L, SAN-AID SI-80L, SAN-AID SI-100L (supplied by Sanshin Chemical Industry Co., Ltd.), CI-2064 (supplied by Nippon Soda Co., Ltd.), IRGACURE261 (supplied by Ciba Specialty Chemicals), ADEKOPTMER SP-170, ADEKAOPTMER SP-150, (supplied by Asahi Denka Kogyo K. K.), and CYRACURE UVI-6990 (supplied by Union Carbide Corporation). The cationic polymerization initiators can be used as an epoxy resin curing agent. These curing agents may be used alone or in combination.

The compound having a polymerizable unsaturated group can be selected from generally known compounds having a polymerizable unsaturated group. Examples thereof include vinyl compounds such as ethylene, propylene and styrene, (meth)acrylates of monohydric and polyhydric alcohols such as methyl(meth)acrylate, 2-hydroxyethyl(meth)acrylate, 2-hydroxypropyl(meth)acrylate, polypropylene glycol di(meth)acrylate, trimethylol propane di(meth)acrylate, trimethylol propane tri(meth)acrylate, pentaerythritol tetra (meth)acrylate and dipentaerythritol hexa (meth)acrylate, epoxy (meth)acrylates such as a bisphenol A type epoxy (meth)acrylate, a bisphenol F type epoxy (meth)acrylate and epoxy (meth)acrylates having a PPE structure disclosed in Japanese patent application No. 2001-387968 and 2002-038156, (meth)acrylates having a PPE skeleton disclosed in Japanese patent application No. 2002-053653 and 2002-055765, and a benzocyclobutene resin. These compounds having an unsaturated group may be used alone or in combination.

The photopolymerization initiator can be selected from generally known photopolymerization initiators. Examples of the photopolymerization initiator include α-diketones such as benzyl and diacetyl, acyloin ethers such as benzoyl ethyl ether and benzoin isopropyl ether, thioxanthones such as thioxanthone, 2,4-diethylthioxanthone and 2-isopropylthioxanthone, benzophenones such as benzophenone and 4,4'-bis(dimethylamino)benzophenone, acetophenones such as acetophenone, 2,2'-dimethoxy-2-phenylacetophenone and β-methoxy acetophenone, and aminoacetophenones such as 2-methyl-1-[4-(methylthio)phenyl]-2-morpholinopropane-1-one and 2-benzyl-2-dimethylamino-1-(-4-morpholinophenyl)-butanone-1. These photopolymerization initiators are used alone or in combination.

Further, the photopolymerization initiator may be used in combination with one kind of or at least two kinds of known photosensitizer(s). Examples of the photosensitizer include N,N-dimethylaminoethylbenzoate, N,N-dimethylaminoisoamylbenzoate, triethanolamine and triethylamine.

The thermal polymerization initiator may be selected from generally known thermal polymerization initiators. Examples thereof include peroxides such as benzoyl peroxide, p-chlorobenzoyl peroxide, di-t-butylperoxide, diisopropyl peroxy carbonate and di-2-ethylhexylperoxycarbonate, and azo compounds such as azobisisobutylonitrile.

Further, when the curable resin composition of the present invention is produced, there may be added a known additive such as an inorganic filler, a color pigment, an antifoamer, a surface conditioner, a flame retardant, an ultraviolet absorber, an antioxidant, a polymerization inhibitor or a flow regulator, as required. Examples of the inorganic filler include silicas such as natural silica, fused silica and amorphous silica, white carbon, titanium white, aerosil, alumina, talc, natural mica, synthetic mica, kaolin, clay, aluminum hydroxide, barium sulfate, E-glass, A-glass, C-glass, L-glass, D-glass, S-glass and M-glass G20. The thus-obtained curable resin composition is suitable for various uses such as a solder resist composition, buildup wiring board materials, insulating coatings, adhesives, printing inks and coating agents.

The cured product of the present invention can be obtained by curing the curable resin composition of the present invention, obtained by the above method, according to a known curing method such as a curing method using an electron beam, ultraviolet light or heat. When ultraviolet light is used for the curing, there may be used a low-pressure mercury lamp, an intermediate-pressure mercury lamp, a high-pressure mercury lamp, an ultrahigh-pressure mercury lamp, a xenon lamp and a metal halide lamp as a light source for ultraviolet light.

EFFECT OF THE INVENTION

The vinyl compound of the present invention has a high glass transition temperature and gives a cured product having a low dielectric constant and a low dielectric loss tangent so that it is remarkably useful as a high-functional polymer material.

Further, the vinyl compound of the present invention can be cured by heat or light so that it can be used, as a thermally and electrically excellent material, for various uses such as various coating agents, UV coating compositions, adhesives, resists and buildup laminate materials.

EXAMPLES

The present invention will be explained more concretely with reference to Examples hereinafter, while the present invention shall not be specially limited to these Examples. Number average molecular weights and weight average molecular weights were measured according to the gel permeation chromatography (GPC) method.

Example 1

Synthesis of Bifunctional PPE Oligomer Compound

A longitudinally long reactor having a volume of 2 liters and equipped with a stirrer, a thermometer, an air-introducing tube and baffleplates was charged with 1.3 g (0.012 mol) of CuCl, 70.7 g (0.55 mol) of di-n-butylamine and 400 g of methyl ethyl ketone. The components were stirred at a reaction temperature of 40° C. A solution of 43.2 g (0.16 mol) of 2,2',3,3',5,5'-hexamethyl-[1,1'-biphenyl]-4,4'-diol as a bivalent phenol and 58.6 g (0.48 mol) of 2,6-dimehtylphenol in 800 g of methyl ethyl ketone was dropwise added to the reactor over 120 minutes while carrying out bubbling with 2 L/min of air. After the completion of the addition, stirring was carried out for 60 minutes while continuing the bubbling with 2 L/min of air. A disodium dihydrogen ethylenediamine tetraacetate aqueous solution was added to the stirred mixture to terminate the reaction. Then, washing was carried out with 1N hydrochloric acid aqueous solution and then washing was carried out with pure water. The thus-obtained solution was concentrated by an evaporator and then dried under reduced pressure, to obtain 96.7 g of a resin represented by the formula (8). The resin had a number average molecular weight of 810, a weight average molecular weight of 1,105 and a hydroxyl group equivalent of 475.

Synthesis of Vinyl Compound

A reactor equipped with a stirrer, a thermometer and a reflux tube was charged with 50 g of the above resin, 26 g of chloromethylstyrene (supplied by Tokyo Kasei Kogyo Co., Ltd.), 200 g of tetrahydrofuran, 24 g of potassium carbonate and 6 g of 18-crown-6-ether, and the components were stirred at a reaction temperature of 30° C. The reaction was traced by a NMR measurement and the reaction was terminated after 6-hours stirring. The tetrahydrofuran was evaporated and then the resultant product was diluted with 200 g of toluene and then washed with pure water. An organic layer was concentrated and then dropwise added to methanol, to carry out a reprecipitation. A solid was recovered by filtration and the recovered solid was dried in vacuum to obtain 44 g of a vinyl compound resin represented by the formula (1). The vinyl compound resin had a number average molecular weight of 993 and a weight average molecular weight of 1,499.

Example 2

10 g of the vinyl compound resin obtained in Example 1 was molten, degassed and molded at 150° C. and then thermally cured at 200° C. for 6 hours, to obtain a cured product.

Example 3

6 g of the vinyl compound resin obtained in Example 1 and 0.6 g of IRGACURE819 (supplied by Ciba Specialty Chemicals, photopolymerization initiator) were dissolved in 4 g of carbitol acetate to obtain a resin composition. The resin composition was applied to a copper-clad laminate surface with a screen-printing machine and then dried with an air dryer at 80° C. for 30 minutes. Then a pattern film was placed thereon and the copper-clad laminate surface was exposed at 2,000 mJ/cm$^2$ using a UV irradiation device (supplied by EYE GRAPHICS Co., Ltd.: UB0151, light source: metal halide lamp). After the exposure, development was carried out with methyl ethyl ketone. In this case, only non-exposed portions were dissolved in the methyl ethyl ketone, to obtain a development pattern of a resin-cured product. A pencil mar strength (JIS K5400) of the resin-cured product was H.

Measurement Methods

The cured product of the vinyl compound resin obtained in Example 2 was evaluated for properties by the following methods.

Glass transition temperature (Tg): determined according to a dynamic viscoelasticity measurement (DMA). The measurement was carried out at an oscillation frequency of 10 Hz.

Dielectric constant and dielectric loss tangent: determined according to a cavity resonant oscillation method.

Table 1 shows evaluation results of the above physical properties.

TABLE 1

|  | Example 2 |
|---|---|
| Tg (° C.) | 195 |
| Dielectric constant (1 GHz) | 2.71 |
| Dielectric loss tangent (1 GHz) | 0.0041 |

Example 4

(Synthesis of Bifunctional PPE Oligomer Compound)

A longitudinally long reactor having a volume of 2 liters and equipped with a stirrer, a thermometer, an air-introducing tube and baffleplates was charged with 1.3 g (0.012 mol) of CuCl, 70.7 g (0.55 mol) of di-n-butylamine and 400 g of methyl ethyl ketone. The components were stirred at a reaction temperature of 40° C. A solution of 45.4 g (0.16 mol) of 4,4'-(1-methylethylidene)bis(2,6-dimethylphenol) as a bivalent phenol and 58.6 g (0.48 mol) of 2,6-dimehtylphenol in 800 g of methyl ethyl ketone was dropwise added to the mixture in the reactor over 120 minutes while carrying out bubbling with 2 L/min of air. After the completion of the addition, stirring was carried out for 60 minutes while continuing the bubbling with 2 L/min of air. A disodium dihydrogen ethylenediamine tetraacetate aqueous solution was added to the stirred mixture to terminate the reaction. Then, washing was carried out with 1N hydrochloric acid aqueous solution and then washing was carried out with pure water. The thus-obtained solution was concentrated by an evaporator and then dried under reduced pressure, to obtain 98.8 g of a resin represented by the formula (8). The resin had a number average molecular weight of 845, a weight average molecular weight of 1,106 and a hydroxyl group equivalent of 451.

(Synthesis of Vinyl Compound)

A reactor equipped with a stirrer, a thermometer and a reflux tube was charged with 47 g of the above resin, 26 g of chloromethylstyrene (supplied by Tokyo Kasei Kogyo Co., Ltd.), 200 g of tetrahydrofuran, 24 g of potassium carbonate and 6 g of 18-crown-6-ether, and the components were stirred at a reaction temperature of 30° C. The reaction was traced by a NMR measurement and the reaction was terminated after 6-hours stirring. The tetrahydrofuran was evaporated and then the resultant product was diluted with 200 g of toluene and then washed with pure water. An organic layer was concentrated and then dropwise added to methanol, to carry out a reprecipitation. A solid was recovered by filtration and the recovered solid was dried in vacuum to obtain 40 g of a vinyl compound resin represented by the formula (1). The vinyl compound resin had a number average molecular weight of 1,015 and a weight average molecular weight of 1,504.

10 g of the vinyl compound resin was molten, degassed and molded at 150° C. and then cured at 200° C. for 6 hours, to obtain a cured product. Table 2 shows evaluation results of properties of the cured product.

6 g of the above vinyl compound resin was dissolved in 4 g of carbitol acetate and 0.6 g of Darocur 1173 (supplied by Ciba Specialty Chemicals, photopolymerization initiator) was added to the resultant solution to obtain a resin composition. The resin composition was applied to a copper-clad laminate surface with a screen-printing machine and then dried with an air dryer at 80° C. for 30 minutes. Then a pattern film was placed thereon and the copper-clad laminate surface was exposed at 2000 mJ using a UV irradiation device (supplied by EYE GRAPHICS Co., Ltd.: UB0151, light source: metal halide lamp). After the exposure, development was carried out with methyl ethyl ketone. In this case, only non-exposed portions were dissolved in the methyl ethyl ketone, to obtain a development pattern of a resin-cured product. A pencil mar strength (JIS K5400) of the resin-cured product was H.

Example 5

(Synthesis of Bifunctional PPE Oligomer Compound)

A longitudinally long reactor having a volume of 2 liters and equipped with a stirrer, a thermometer, an air-introducing tube and baffleplates was charged with 1.3 g (0.012 mol) of CuCl, 70.7 g (0.55 mol) of di-n-butylamine and 400 g of methyl ethyl ketone. The components were stirred at a reaction temperature of 40° C. A solution of 51.8 g (0.16 mol) of 4,4'-cyclohexylidenebis(2,6-dimethylphenol) as a bivalent phenol and 58.6 g (0.48 mol) of 2,6-dimehtylphenol in 800 g of methyl ethyl ketone was dropwise added to the mixture in the reactor over 120 minutes while carrying out bubbling with 2 L/min of air. After the completion of the addition, stirring was carried out for 60 minutes while continuing the bubbling with 2 L/min of air. A disodium dihydrogen ethylenediamine tetraacetate aqueous solution was added to the stirred mixture to terminate the reaction. Then, washing was carried out with 1N hydrochloric acid aqueous solution and then washing was carried out with pure water. The thus-obtained solution was concentrated by an evaporator and then dried under reduced pressure, to obtain 102.6 g of a resin represented by the formula (8). The resin had a number average molecular weight of 877, a weight average molecular weight of 1,183 and a hydroxyl group equivalent of 477.

(Synthesis of Vinyl Compound)

A reactor equipped with a stirrer, a thermometer and a reflux tube was charged with 50 g of the above resin, 26 g of chloromethylstyrene (supplied by Tokyo Kasei Kogyo Co., Ltd.), 200 g of tetrahydrofuran, 24 g of potassium carbonate and 6 g of 18-crown-6-ether, and the components were stirred at a reaction temperature of 30° C. The reaction was traced by a NMR measurement and the reaction was terminated after 6-hours stirring. The tetrahydrofuran was evaporated and then the resultant product was diluted with 200 g of toluene and then washed with pure water. An organic layer was concentrated and then dropwise added to methanol, to carry out a reprecipitation. A solid was recovered by filtration and the recovered solid was dried in vacuum to obtain 42 g of a vinyl compound resin represented by the formula (1). The vinyl compound resin had a number average molecular weight of 1,022 and a weight average molecular weight of 1,533.

10 g of the vinyl compound resin was molten, degassed and molded at 150° C. and then cured at 200° C. for 6 hours, to obtain a cured product. Table 2 shows evaluation results of properties of the cured product.

6 g of the above vinyl compound resin was dissolved in 4 g of carbitol acetate and 0.6 g of Darocur 1173 (supplied by Ciba Specialty Chemicals, photopolymerization initiator) was added to the resultant solution to obtain a resin composition. The resin composition was applied to a copper-clad laminate surface with a screen-printing machine and then dried with an air dryer at 80° C. for 30 minutes. Then a pattern film was placed thereon and the copper-clad laminate surface was exposed at 2,000 mJ using a UV irradiation device (supplied by EYE GRAPHICS Co., Ltd.: UB0151, light source: metal halide lamp). After the exposure, development was carried out with methyl ethyl ketone. In this case, only non-exposed portions were dissolved in the methyl ethyl ketone, to obtain a development pattern of a resin-cured product. A pencil mar strength (JIS K5400) of the resin-cured product was H.

Example 6

(Synthesis of Bifunctional PPE Oligomer Compound)

A longitudinally long reactor having a volume of 2 liters and equipped with a stirrer, a thermometer, an air-introducing tube and baffleplates was charged with 1.3 g (0.012 mol) of CuCl, 70.7 g (0.55 mol) of di-n-butylamine and 400 g of methyl ethyl ketone. The components were stirred at a reaction temperature of 40° C. A solution of 45.4 g (0.16 mol) of 4,4'-methylidenebis(2,3,6-trimethylphenol) as a bivalent phenol and 58.6 g (0.48 mol) of 2,6-dimehtylphenol in 800 g of methyl ethyl ketone was dropwise added to the mixture in the reactor over 120 minutes while carrying out bubbling with 2 L/min of air. After the completion of the addition, stirring was carried out for 60 minutes while continuing the bubbling with 2 L/min of air. A disodium dihydrogen ethylenediamine tetraacetate aqueous solution was added to the stirred mixture to terminate the reaction. Then, washing was carried out with 1N hydrochloric acid aqueous solution and then washing was carried out with pure water. The thus-obtained solution was concentrated by an evaporator and then dried under reduced pressure, to obtain 97.4 g of a resin represented by the formula (8). The resin had a number average molecular weight of 852, a weight average molecular weight of 1,133 and a hydroxyl group equivalent of 460.

(Synthesis of Vinyl Compound)

A reactor equipped with a stirrer, a thermometer and a reflux tube was charged with 48 g of the above resin, 26 g of chloromethylstyrene (supplied by Tokyo Kasei Kogyo Co., Ltd.), 200 g of tetrahydrofuran, 24 g of potassium carbonate and 6 g of 18-crown-6-ether, and the components were stirred at a reaction temperature of 30° C. The reaction was traced by a NMR measurement and the reaction was terminated after 6-hours stirring. The tetrahydrofuran was evaporated and then the resultant product was diluted with 200 g of toluene and then washed with pure water. An organic layer was concentrated and then dropwise added to methanol, to carry out a reprecipitation. A solid was recovered by filtration and the recovered solid was dried in vacuum to obtain 38 g of a vinyl compound resin represented by the formula (1). The vinyl compound resin had a number average molecular weight of 1,011 and a weight average molecular weight of 1,510.

10 g of the vinyl compound resin was molten, degassed and molded at 150° C. and then cured at 200° C. for 6 hours, to obtain a cured product. Table 2 shows evaluation results of properties of the cured product.

6 g of the above vinyl compound resin was dissolved in 4 g of carbitol acetate and 0.6 g of Darocur 1173 (supplied by Ciba Specialty Chemicals, photopolymerization initiator) was added to the resultant solution to obtain a resin composition. The resin composition was applied to a copper-clad laminate surface with a screen-printing machine and then dried with an air dryer at 80° C. for 30 minutes. Then a pattern film was placed thereon and the copper-clad laminate surface was exposed at 2,000 mJ using a UV irradiation device (supplied by EYE GRAPHICS Co., Ltd.: UB0151, light source: metal halide lamp). After the exposure, development was carried out with methyl ethyl ketone. In this case, only non-exposed portions were dissolved in the methyl ethyl ketone, to obtain a development pattern of a resin-cured product. A pencil mar strength (JIS K5400) of the resin-cured product was H.

Example 7

(Synthesis of Bifunctional PPE Oligomer Compound)

A longitudinally long reactor having a volume of 2 liters and equipped with a stirrer, a thermometer, an air-introducing tube and baffleplates was charged with 1.3 g (0.012 mol) of CuCl, 70.7 g (0.55 mol) of di-n-butylamine and 400 g of methyl ethyl ketone. The components were stirred at a reaction temperature of 40° C. A solution of 68.8 g (0.16 mol) of 4,4'-[1,4-phenylenebis(1-methylethylidene)]bis(2,3,6-trimethylphenol) as a bivalent phenol and 58.6 g (0.48 mol) of 2,6-dimehtylphenol in 800 g of methyl ethyl ketone was dropwise added to the mixture in the reactor over 120 minutes while carrying out bubbling with 2 L/min of air. After the completion of the addition, stirring was carried out for 60 minutes while continuing the bubbling with 2 L/min of air. A disodium dihydrogen ethylenediamine tetraacetate aqueous solution was added to the stirred mixture to terminate the reaction. Then, washing was carried out with 1N hydrochloric acid aqueous solution and then washing was carried out with pure water. The thus-obtained solution was concentrated by an evaporator and then dried under reduced pressure, to obtain 114.6 g of a resin represented by the formula (8). The resin had a number average molecular weight of 934, a weight average molecular weight of 1,223 and a hydroxyl group equivalent of 496.

(Synthesis of Vinyl Compound)

A reactor equipped with a stirrer, a thermometer and a reflux tube was charged with 52 g of the above resin, 26 g of chloromethylstyrene (supplied by Tokyo Kasei Kogyo Co., Ltd.), 200 g of tetrahydrofuran, 24 g of potassium carbonate and 6 g of 18-crown-6-ether, and the components were stirred at a reaction temperature of 30° C. The reaction was traced by a NMR measurement and the reaction was terminated after 6-hours stirring. The tetrahydrofuran was evaporated and then the resultant product was diluted with 200 g of toluene and then washed with pure water. An organic layer was concentrated and then dropwise added to methanol, to carry out a reprecipitation. A solid was recovered by filtration and the recovered solid was dried in vacuum to obtain 44 g of a vinyl compound resin represented by the formula (1). The vinyl compound resin had a number average molecular weight of 1, 107 and a weight average molecular weight of 1,651.

10 g of the vinyl compound resin was molten, degassed and molded at 150° C. and then cured at 200° C. for 6 hours, to obtain a cured product. Table 2 shows evaluation results of properties of the cured product.

6 g of the above vinyl compound resin was dissolved in 4 g of carbitol acetate and 0.6 g of Darocur 1173 (supplied by Ciba Specialty Chemicals, photopolymerization initiator) was added to the resultant solution to obtain a resin composition. The resin composition was applied to a copper-clad laminate surface with a screen-printing machine and then dried with an air dryer at 80° C. for 30 minutes. Then a pattern film was placed thereon and the copper-clad laminate surface was exposed at 2,000 mJ using a UV irradiation device (supplied by EYE GRAPHICS Co., Ltd.: UB0151, light source: metal halide lamp). After the exposure, development was carried out with methyl ethyl ketone. In this case, only non-exposed portions were dissolved in the methyl ethyl ketone, to obtain a development pattern of a resin-cured product. A pencil mar strength (JIS K5400) of the resin-cured product was H.

Example 8

(Synthesis of Bifunctional PPE Oligomer Compound)

A longitudinally long reactor having a volume of 2 liters and equipped with a stirrer, a thermometer, an air-introducing tube and baffleplates was charged with 1.3 g (0.012 mol) of CuCl, 70.7 g (0.55 mol) of di-n-butylamine and 400 g of methyl ethyl ketone. The components were stirred at a reaction temperature of 40° C. A solution of 41.0 g (0.16 mol) of 4,4'-methylenebis(2,6-dimethylphenol) as a bivalent phenol and 58.6 g (0.48 mol) of 2,6-dimehtylphenol in 800 g of methyl ethyl ketone was dropwise added to the mixture in the reactor over 120 minutes while carrying out bubbling with 2 L/min of air. After the completion of the addition, stirring was carried out for 60 minutes while continuing the bubbling with 2 L/min of air. A disodium dihydrogen ethylenediamine tetraacetate aqueous solution was added to the stirred mixture to terminate the reaction. Then, washing was carried out with 1N hydrochloric acid aqueous solution and then washing was carried out with pure water. The thus-obtained solution was concentrated by an evaporator and then dried under reduced pressure, to obtain 94.6 g of a resin represented by the formula (8). The resin had a number average molecular weight of 801, a weight average molecular weight of 1,081 and a hydroxyl group equivalent of 455.

(Synthesis of Vinyl Compound)

A reactor equipped with a stirrer, a thermometer and a reflux tube was charged with 48 g of the above resin, 26 g of chloromethylstyrene (supplied by Tokyo Kasei Kogyo Co., Ltd.), 200 g of tetrahydrofuran, 24 g of potassium carbonate and 6 g of 18-crown-6-ether, and the components were stirred at a reaction temperature of 30° C. The reaction was traced by a NMR measurement and the reaction was terminated after 6-hours stirring. The tetrahydrofuran was evaporated and then the resultant product was diluted with 200 g of toluene and then washed with pure water. An organic layer was concentrated and then dropwise added to methanol, to carry out a reprecipitation. A solid was recovered by filtration and the recovered solid was dried in vacuum to obtain 39 g of a vinyl compound resin represented by the formula (1). The vinyl compound resin had a number average molecular weight of 988 and a weight average molecular weight of 1,420.

10 g of the vinyl compound resin was molten, degassed and molded at 150° C. and then cured at 200° C. for 6 hours, to obtain a cured product. Table 2 shows evaluation results of properties of the cured product.

6 g of the above vinyl compound resin was dissolved in 4 g of carbitol acetate and 0.6 g of Darocur 1173 (supplied by Ciba Specialty Chemicals, photopolymerization initiator) was added to the resultant solution to obtain a resin composition. The resin composition was applied to a copper-clad laminate surface with a screen-printing machine and then dried with an air dryer at 80° C. for 30 minutes. Then a pattern film was placed thereon and the copper-clad laminate surface was exposed at 2,000 mJ using a UV irradiation device (supplied by EYE GRAPHICS Co., Ltd.: UB0151, light source: metal halide lamp). After the exposure, development was carried out with methyl ethyl ketone. In this case, only non-exposed portions were dissolved in the methyl ethyl ketone, to obtain a development pattern of a resin-cured product. A pencil mar strength (JIS K5400) of the resin-cured product was H.

Table 2 shows evaluation results of physical properties of the above resin-cured products.

TABLE 2

| | Example 4 Cured product | Example 5 Cured product | Example 6 Cured product | Example 7 Cured product | Example 8 Cured product |
|---|---|---|---|---|---|
| Tg (° C.) | 188 | 192 | 190 | 202 | 191 |
| Dielectric constant (1 GHz) | 2.80 | 2.82 | 2.79 | 2.80 | 2.78 |
| Dielectric loss tangent (1 GHz) | 0.0055 | 0.0053 | 0.0053 | 0.0054 | 0.0052 |

What is claimed is:

1. A vinyl compound of the formula (1),

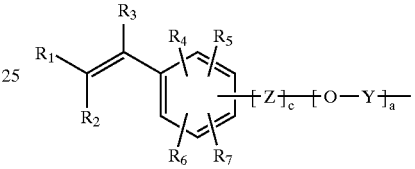

(1)

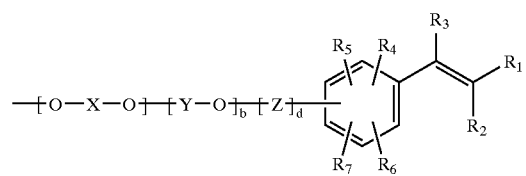

(2)

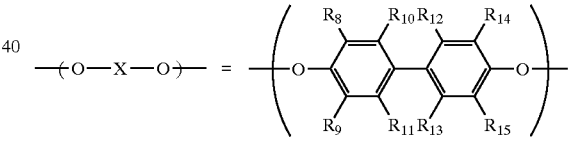

(3)

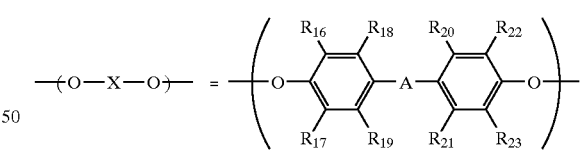

(4)

wherein $R_1$, $R_2$, $R_3$, $R_4$, $R_5$, $R_6$ and $R_7$ may be the same or different and are a hydrogen atom, a halogen atom, an alkyl group, a halogenated alkyl group or a phenyl group, —(O—X—O)— is represented by the formula (2) or the formula (3) in which $R_8$, $R_9$, $R_{10}$, $R_{14}$, $R_{15}$, $R_{16}$, $R_{17}$, $R_{22}$ and $R_{23}$ may be the same or different and are a halogen atom, an alkyl group having 1 to 6 carbon atoms or a phenyl group, $R_{11}$, $R_{12}$, $R_{13}$, $R_{18}$, $R_{19}$, $R_{20}$ and $R_{21}$ may be the same or different and are a hydrogen atom, a halogen atom, an alkyl group having 1 to 6 carbon atoms or a phenyl group, and A is a cyclic hydrocarbon which has 6 to 20 carbon atoms and which may have a substituent, —(Y—O)— is an arrangement of one kind of structure defined by the formula (4) or a random arrangement of at least two kinds of structures defined by the formula (4) in which $R_{24}$ and $R_{25}$ may be the same or different and are a halogen atom, an alkyl group having 1 to 6 carbon atoms or a phenyl group, and $R_{26}$ and $R_{27}$ may be the same or different and are a hydrogen atom, a halogen atom, an alkyl group having 1 to 6 carbon atoms or a phenyl group, Z is an organic group which has at least one carbon atom and which may contain an oxygen atom, a nitrogen atom, a sulfur atom or a halogen atom, each of a and b is an integer of 0 to 300, provided that at least either a or b is not 0, and each of c and d is an integer of 0 or 1.

2. A vinyl compound according to claim 1,
wherein $R_8$, $R_9$, $R_{10}$, $R_{14}$, $R_{15}$, $R_{16}$, $R_{17}$, $R_{22}$ and $R_{23}$ in the formula (2) or the formula (3) may be the same or different and are an alkyl group having 1 to 3 carbon atoms, and $R_{11}$, $R_{12}$, $R_{13}$, $R_{18}$, $R_{19}$, $R_{20}$ and $R_{21}$ may be the same or different and are a hydrogen atom or an alkyl group having 1 to 3 carbon atoms.

3. A vinyl compound according to claim 1,
wherein $R_{24}$ and $R_{25}$ in the formula (4) may be the same or different and are an alkyl group having 1 to 3 carbon atoms, and $R_{26}$ and $R_{27}$ in the formula (4) may be the same or different and are a hydrogen atom or an alkyl group having 1 to 3 carbon atoms.

4. A vinyl compound according to claim 1,
wherein $R_8$, $R_9$, $R_{10}$, $R_{14}$, $R_{15}$, $R_{16}$, $R_{17}$, $R_{22}$ and $R_{23}$ in —(O—X—O)— of the formula (2) or the formula (3) are a methyl group and —(Y—O)— has an arrangement structure of the formula (5) or the formula (6) or a random arrangement structure of the formula (5) and the formula (6).

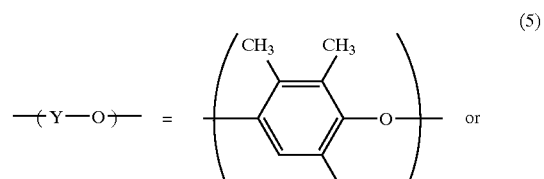

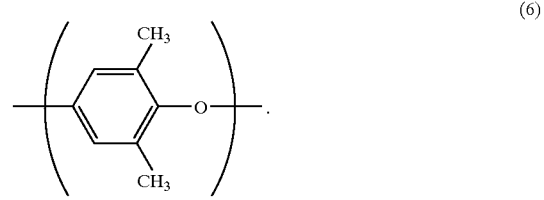

5. A vinyl compound according to claim 4,
wherein —(O—X—O)— of the formula (2) is represented by the formula (7).

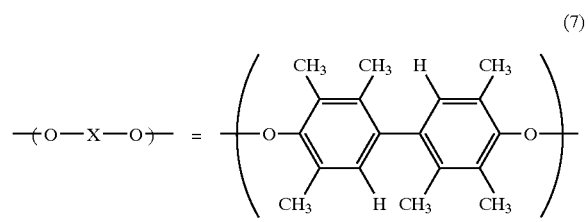

6. A curable resin composition containing the vinyl compound as recited in claim 1.

7. A photosensitive resin composition containing the vinyl compound as recited in claim 1 and a photopolymerization initiator.

8. A cured product obtained by curing the curable resin composition as recited in claim 7 or composition as recited in claim 7.

* * * * *